W. C. PAUL.
TYPE WRITING MACHINE.
APPLICATION FILED APR. 23, 1903. RENEWED OCT. 11, 1909.

957,624.

Patented May 10, 1910.
5 SHEETS—SHEET 1.

WITNESSES:

INVENTOR
William C. Paul
BY
ATTORNEYS.

W. C. PAUL.
TYPE WRITING MACHINE.
APPLICATION FILED APR. 23, 1903. RENEWED OCT. 11, 1909.

957,624.

Patented May 10, 1910.
5 SHEETS—SHEET 3.

WITNESSES:

INVENTOR
William C. Paul
BY
ATTORNEYS.

W. C. PAUL.
TYPE WRITING MACHINE.
APPLICATION FILED APR. 23, 1903. RENEWED OCT. 11, 1909.
957,624.
Patented May 10, 1910.
5 SHEETS—SHEET 4.
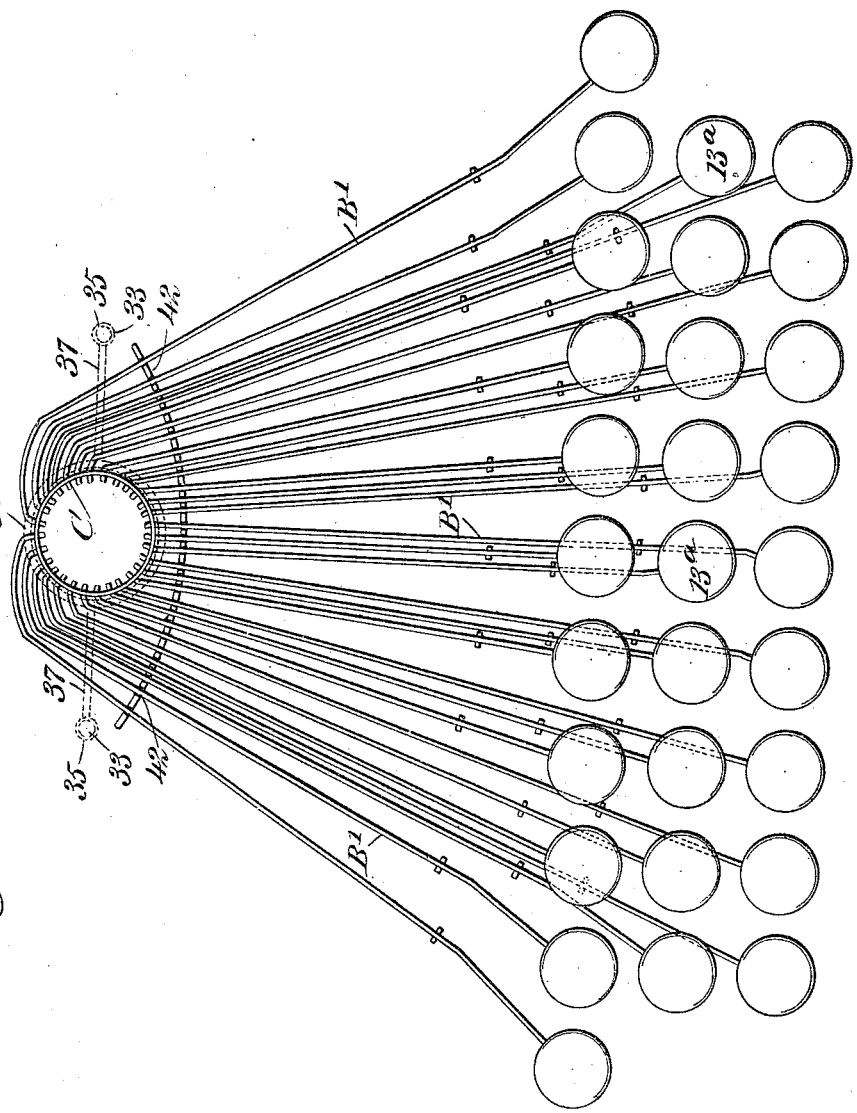
WITNESSES:
INVENTOR
William C. Paul
BY
ATTORNEYS.

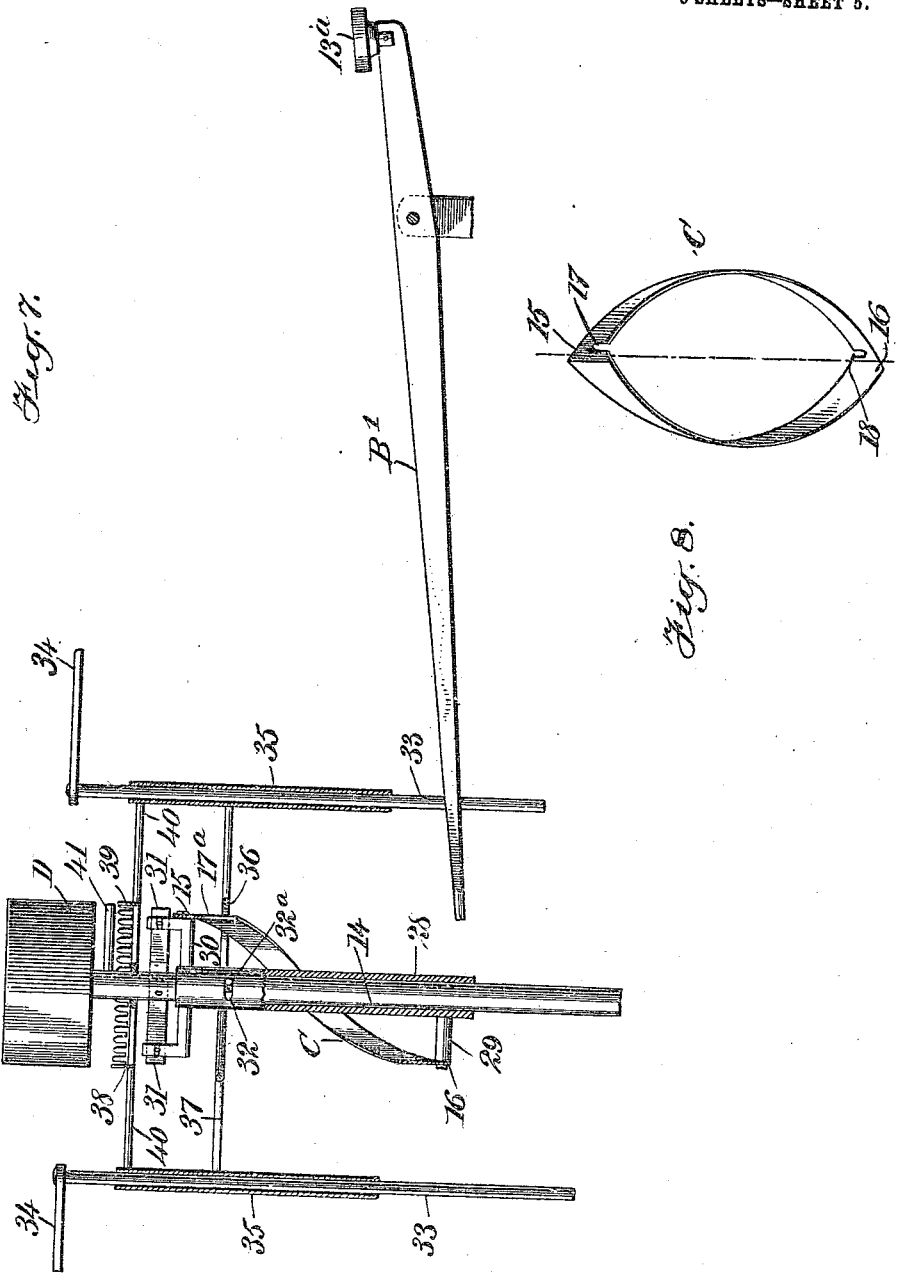

UNITED STATES PATENT OFFICE.

WILLIAM C. PAUL, OF NEW YORK, N. Y.

TYPE-WRITING MACHINE.

957,624.     Specification of Letters Patent.     Patented May 10, 1910.

Application filed April 23, 1903, Serial No. 153,992. Renewed October 11, 1909. Serial No. 522,126.

*To all whom it may concern:*

Be it known that I, WILLIAM C. PAUL, a citizen of the United States, and a resident of the city of New York, borough of Manhattan, in the county and State of New York, have invented a new and Improved Type-Writing Machine, of which the following is a full, clear, and exact description.

The purpose of the invention is to provide an improvement in type writing machines, particularly of the wheel class, or class wherein a wheel is mounted to turn upon a spindle, and to provide novel and simple means for automatically operating a type wheel to the various printing positions corresponding to the keys depressed, and for automatically locking the wheel in position during the operation of printing.

A further purpose of the invention is to provide a construction whereby the above results will be obtained in an exceedingly simple and economic manner, and to so construct the improved mechanism, that it can be advantageously employed in machines used for embossing, or perforating checks, or in machines of like character.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
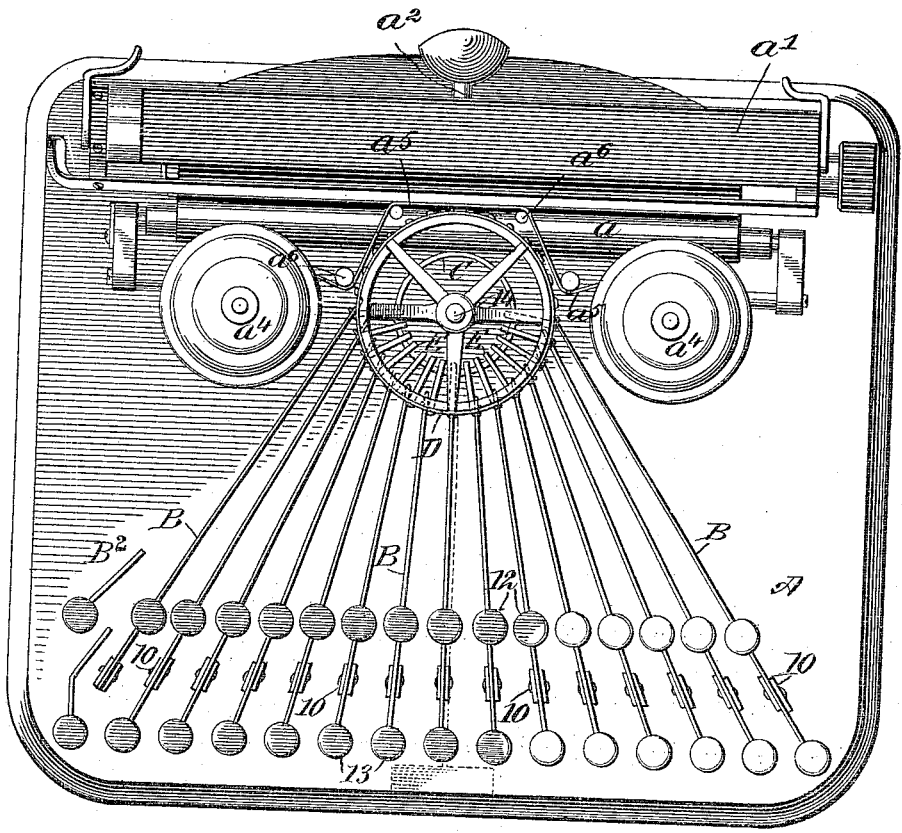
Figure 2:
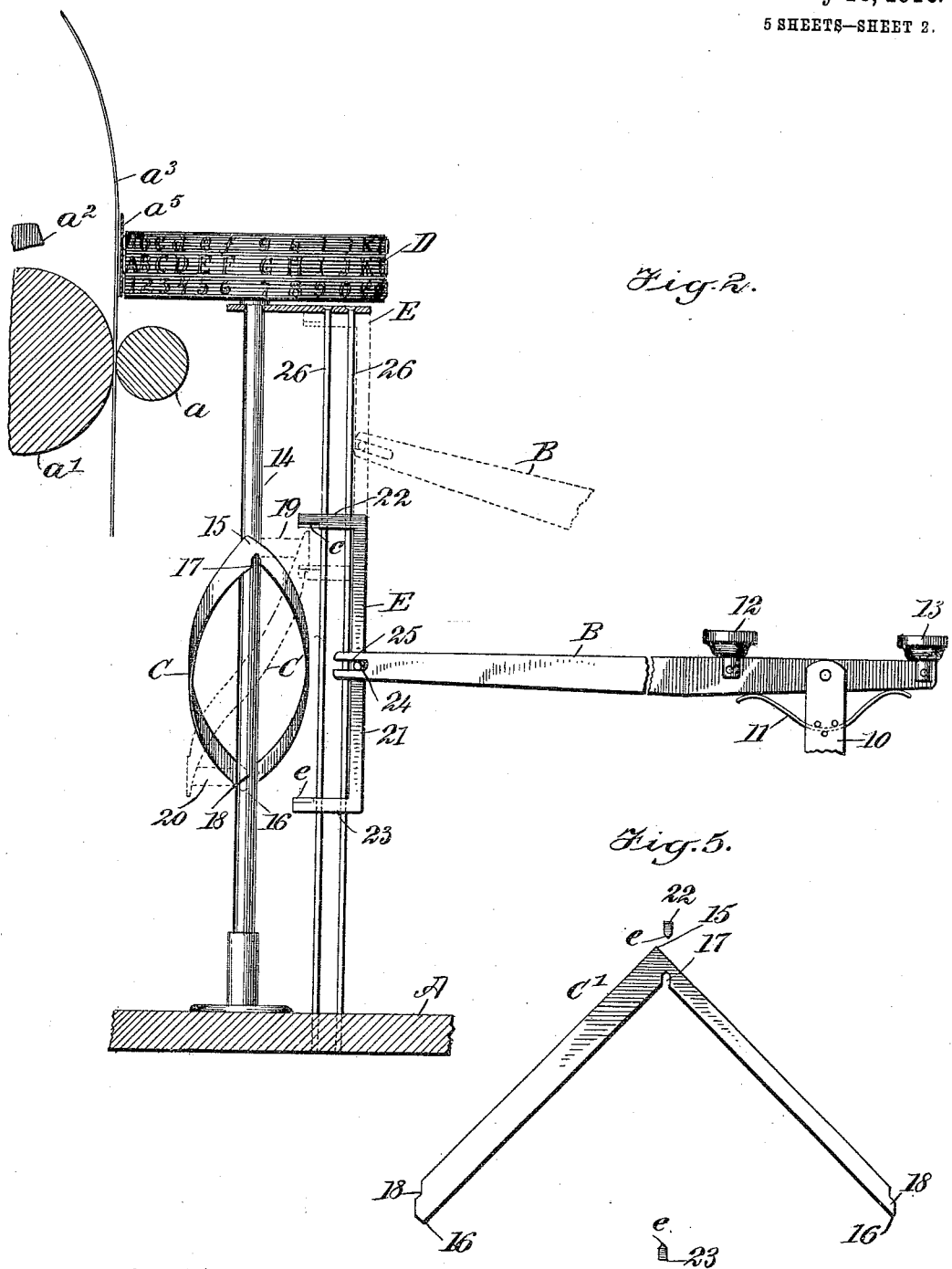
Figure 3:
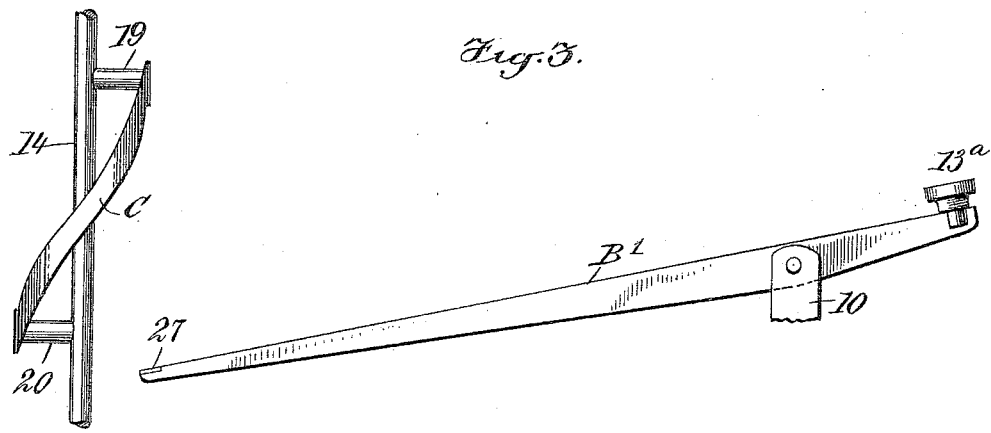
Figure 4:
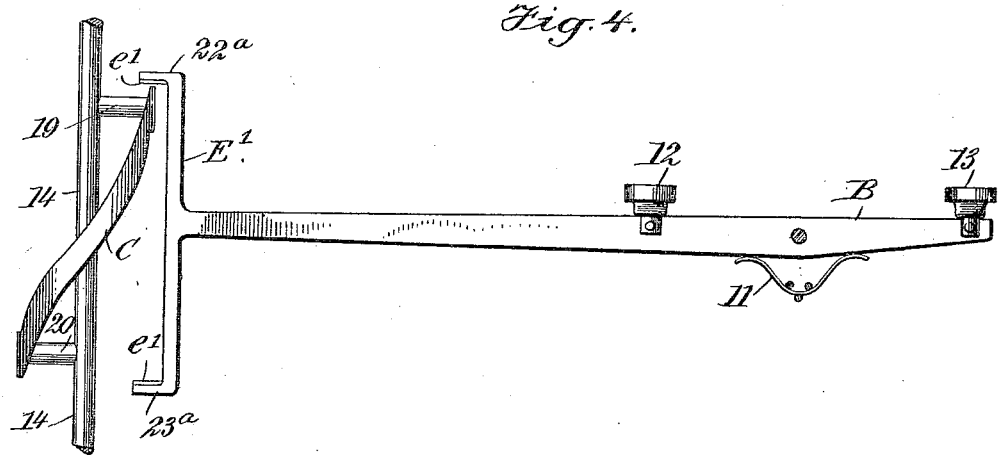

Figure 1 is a plan view of a type writing machine having the improvement applied and provided with a double-shift keyboard; Fig. 2 is a vertical section through a portion of the machine shown in Fig. 1, illustrating the type wheel and its operating mechanism in side elevation, excepting the shifting cam for the type wheel, which is in face view; said view likewise illustrating a side elevation of one of the double-acting key levers pivotally attached to an operating fork for the shifting cam; Fig. 3 is an elevation of a portion of the type wheel spindle, a side view of the shifting cam for the type wheel and a side elevation of a single-acting key lever adapted to operate on the shifting cam; Fig. 4 is a view similar to Fig. 3, except that a double-acting key lever is shown in side elevation and the operating fork for the shifting cam as rigidly attached to the key lever; Fig. 5 is a diagrammatic plan view of the shifting cam laid flat, and a section through the tines of the operating fork, illustrating the position of the tines relative to the points of the cam; Fig. 6 is a diagrammatic plan view of the key board of single-acting keys, illustrating the adaptation of the key levers to the improved shifting cam; Fig. 7 is a sectional side elevation of the type wheel and its support and the operating mechanism for the type wheel, the section being taken through the character of machine shown in Fig. 6; and Fig. 8 is a plan view of the shifting cam complete.

In Figs. 1 and 2, A represents the base of a type-writing machine, B key levers pivoted near their outer ends upon suitable supports 10, attached to the base, the key levers being held in and returned to normal position by springs 11 located preferably at their pivot points. In the double-acting form of the key levers shown in Figs. 1 and 2 and likewise in Fig. 4, two buttons 12 and 13 are employed upon each key lever, arranged preferably at an equal distance one at each side of the pivot, the outer button 13 of a key lever being usually at or near the extreme outer end of the same. Thus by pressing upon the outer button 13 the inner end of the key lever B will be raised; and by pressing upon the inner button 12 the inner end of the key lever will be depressed. Characters, letters in upper or lower case, numerals or punctuation marks may be produced upon the said buttons.

The main feature of my invention relates to a spiral skeleton cam C, its connection with the type wheels spindle and the manner in which the cam C is turned to bring the desired letter, character or numeral in printing position.

Referring back to Figs. 1 and 2, $a$ represents a tension roller, $a'$ a feed roller and $a^2$ the hammer adapted to press the paper against the presented type on the type wheel to make an impression, all of which may be operated in any approved manner. $a^3$ represents the paper to be printed upon, $a^4$ the spools carrying the inking ribbon $a^5$, which ribbon is conducted over suitable guides $a^6$ to a proper position between the type wheel D and the paper $a^3$, or an apertured shell or rest for the paper when one is employed. The type wheel D is cylindrical in shape and may be provided with one row of letters or characters arranged around the periphery in a belt, or with two or more rows, or for example lower and upper case letters, numerals and punctuation points, signs and characters; and in connection with the type wheel one or more shifting keys B² may be employed in the customary manner to bring the proper belt of type in position for printing; or any approved automatic shifting device for the same purpose may be employed in connection with the said type wheel, which type wheel may have a solid or an elastic type-bearing periphery. The number of keys or buttons 13 corresponds to the number of type on a belt of the type wheel, but the key levers preferably aggregate an odd number, so that when any key lever is in locking engagement with the shifting cam C, the engaging portion of the lever to be next operated will not be directly over or under the points of the cam, which is to be hereinafter described, in which latter position the key or lever next operated might interfere with the proper and immediate operation of the shifting cam C. A spindle 14, in one or more properly connected sections, is attached to the type wheel D at one end, and is mounted to turn, for example, upon the base A having suitable supports in the frame of the machine.

The blank C' of the shifting cam C is shown in Fig. 5, in which it will be seen that the blank is substantially triangular, or is in the form of a V. In the formation of the cam, which is of skeleton construction, the ends of the limbs of the blank are brought together and secured, forming thereby a spiral figure, oblong in face view and circular in plan view with pointed terminal ends 15 and 16, said ends being inclined in opposite directions, as is shown in Figs. 1, 2, 3, 7 and 8. This shifting cam is preferably made of sheet or tubular metal, brass, steel, iron or aluminum, or other material may be employed. The blank C is so cut that when the shifting cam is properly formed to be used in connection with one form of key lever B, the double-acting levers shown in Figs. 1, 2 and 4 for example, a slot is formed in the inner edge of the said cam adjacent to each point 15 and 16, and said slots, which are designated as 17 and 18, are slightly at one side of a line drawn through the points 15 and 16, as is shown in Fig. 8.

The double acting key levers B, of the form shown in Fig. 4, are arranged radially to the shifting cam C, thus forming a semicircular key-board; and the said shifting cam C is offset from the spindle 14 carrying the type wheel, the said spindle passing through the said cam, as is shown particularly in Figs. 2, 3 and 4. Therefore, the cam has a spiral relation to the spindle 14 which passes through the central portion of the cam, and the said cam at its pointed ends is offset from the spindle 14 by means of pins or projections 19 and 20, secured to the said spindle and to the inner face of the shifting cam C at its pointed ends as is especially shown in Figs. 3 and 4. It will be understood, however, that the said double acting key levers may be placed non-radially or tangentially, but under such an arrangement they must be bent at their inner ends in similar manner as is shown in Fig. 6.

In order that the double-acting key levers B may be arranged non-radially or tangentially to the shifting cam C, and thus brought together to form the straight-line keyboard shown in Fig. 1, each double-acting key lever B is pivotally connected to the central portion of an operating fork E, which fork is adapted to operate upon the shifting cam C to turn the said cam a proper distance, and thus bring the proper letter, numeral or character in position to make an impression. This fork E consists of a body section 21, which extends in line parallel with the longitudinal axis of the shifting cam C, and upper and lower tines 22 and 23, which are at right angles to the body 21, and extend in direction of the said shifting cam C; preferably the inner edges e of the said tines 22 and 23 at their inner or free ends are more or less sharpened or given a knife edge, as such edges are adapted to enter the slots 17 and 18 in the shifting cam C, to produce a locking engagement with the said cam C, after the operating fork has turned the said cam, and consequently the spindle 14 and the type wheel D, the desired distance, but while the knife edge e is provided so that it will readily enter the slots 17 and 18, the principal purpose of such formation is to present a sharp edge to the points 15 and 16. A pin 24 is extended from the central portion of the body 21 of the said fork E, and this pin 24 is loosely received in a slot 25 which is made in the inner end of a double-acting key lever B. The relative construction of each double-acting key lever B and fork E is as shown in Figs. 1 and 2; but a fork E may be attached to a double-acting lever B directly or integrally as is shown in Fig. 4.

When a fork E is pivotally attached to a double-acting key lever B as shown in Figs. 1 and 2, the said fork is adapted to slide upon guide bars 26, which are parallel with the spindle 14 carrying the type wheel and to which the shifting cam C is secured, as is particularly shown in Fig. 2, so that under these conditions the operating forks E have guided and positive movement parallel with the spindle on which the shifting cam C is located.

The tines 22 and 23 of the fork E are so located relative to the shifting cam C, that in no locked position of the said cam C will the knife or beveled edges e of the tines of a fork E be directly over the upper or under the lower point of the cam, as is shown in Fig. 5, but will be at one side of the said points. Thus at each operation of the key lever B the tines will positively and immediately act upon an edge of the shifting cam C to turn the said cam the desired distance. It may be here remarked, that in the operation of a fork E, the upper tine 22 will engage with one longitudinal edge of the shifting cam C, and after the cam has been shifted or turned a suitable distance, the beveled portion e of the said tine will enter the lower slot 18 in the said cam, and will prevent the cam from further turning. It is natural, under this construction of the operating device for a type wheel, that the type wheel and its shifting cam C will remain in the position to which they were carried by the operation of one key lever until another key lever is operated to change the position of the said shifting cam, and consequently the position of the type wheel. However, it is not necessary to the operation of the machine that the shifting cam shall remain in the position in which it is left by a key lever, as the type wheel may be turned by hand, or otherwise, to any position; and yet when the next key lever is operated it will act through the medium of the shifting cam to turn the type wheel to its desired position. If the shifting cam is turned by hand so that its point rests directly over or under the knife edge of a key lever, the sharpness of the key lever will prevent the two parts from blocking; but as an extra precaution, the machine is so arranged that the said parts will never assume the above-named position except by some action other than that of the key levers. The upper tine 22 is brought into action when the inner button 12 of a key lever B is pressed downward; but when the outer button 13 of a key lever is pressed downward, the fork E operates in an opposite direction, and the tine 23 will engage with the opposite edge of the shifting cam C, turning it to an opposite position; when the cam has been turned as far as is necessary to produce the proper impression, the knife or bevel edge e of the said tine 23 of the fork E will have entered the upper slot 17 in the said shifting cam C, and will prevent the cam from turning farther. At each operation of a key lever B, after the locking engagement has been secured between the fork E and the shifting cam C, immediately after the key lever is released from pressure its spring 11 will return the lever and the fork to their normal position, leaving the cam C and type wheel D in the position to which they had been adjusted.

In Fig. 4 I have illustrated a double-acting key lever B, which differs only from the corresponding lever shown in Figs. 1 and 2, in that the fork E' forms an integral portion of the inner end of the key lever, or is attached thereto permanently in any desired manner. The fork E' is of the same form as the fork E heretofore described, and is provided with an upper inwardly-extending tine 22$^a$ and a lower inwardly-extending tine 23$^a$; and both of these tines at their inner faces have knife edges e' corresponding to the edges e shown in Fig. 2. The forks E' act upon the shifting cam C in the same manner as to the forks E heretofore referred to. The action of the fork E' is identical with that of the fork E, except that the fork E travels perfectly parallel with the spindle 14 of the type wheel D, while the fork E' travels on a slight arc of a circle.

In Fig. 3 I have illustrated a single-acting key lever B', having a single button 13$^a$ at its outer end; and in pressing down the said button 13$^a$, the inner or longer end of the said key lever, which is provided with a beveled upper surface 27, is carried upward, and this beveled surface 27 of the single-acting form of key lever, engages with the under or lower edge of one side of the shifting cam C, and in locking the cam enters the upper slot 17 of said cam. The shifting cam C which is employed in connection with the single-acting key lever is provided with a slot 17 at its upper point 15 only.

I desire it to be understood that each key lever B of the double-acting type, imparts a revolution to a certain extent in one direction, to the shifting cam C; and when the said key lever is moved in the opposite direction, the shifting cam is turned a corresponding distance in a reverse direction; so that each key lever B may be operated to bring two characters, type or other matter on the type wheel, in position for printing, not simultaneously, but at each individual operation of the key lever. Each double-ended key lever controls two positions of the type wheel; whereas, each single-ended key lever controls but one position of the type wheel.

Under the construction shown in Figs. 6 and 7, the single-acting form of key lever B' is employed; and in Fig. 6 I have illustrated a diagrammatic view, illustrating the manner in which the various single-acting key levers B' operate upon the shifting cam C. The levers B' are pivoted upon a suitable base in any approved manner, and rest in recesses in a comb bar 42. The inner ends of the key levers B' are so curved, or so bent that they are arranged in circular form at their inner ends non-radially or tangentially to the shifting cam C, in engagement with the under edge of the cam at both sides thereof. Under this arrangement, the shifting cam C is provided with a single upper slot 17$^a$ at its upper point 15, there being no necessity for a slot at the lower point 16; but the slot 17$^a$ at the upper portion of the cam C is made deeper and wider than shown in the other views. A sleeve 28 is mounted to turn around the spindle 14 carrying the type wheel D, and this sleeve is attached by a suitable post 29 to the lower portion of the shifting cam C, while the upper point of the shifting cam C is attached to one arm of a U-shaped frame 30, extending from each side of the upper portion of the sleeve 28 as is shown in Fig. 7. A spring 31 is attached to the upwardly extending members of this frame 30, which spring passes through the spindle 14 for the type wheel D and is secured to said spindle. The sleeve 28 has limited rotary motion on the spindle 14, the sleeve being provided with a diametrical slot 32 near its upper end, which receives a pin 32$^a$ carried by the spindle 14, as is shown in Fig. 7. At each side of the spindle 14 a post or standard 33 is secured, braced to the frame of the machine at the top by suitable standards 34, and tubes 35 are mounted to slide on the said standards 33. A ring 36 is made to encircle the upper portion of the sleeve 28, and loosely inclose the upper portion of the shifting cam C, and this ring is secured to the tubes 35 by means of horizontal arms 37. Above the ring 36 a second ring 38 is located, having guided vertical movement upon the spindle 14, and this ring is provided with a series of upwardly extending teeth 39, having their upper ends oppositely and downwardly beveled, and the notches or slots between the teeth 39 are equal in number to the characters in each row around the type wheel. The said upper ring 38 is also attached to the said tubes 35 by arms 40, as is illustrated in Fig. 7. At the upper portion of the spindle 14, just below the type wheel D, a pin 41 extends from the said spindle, adapted to enter the spaces between the teeth 39 of the upper ring 38. In the operation of this form of the machine, in which the single-acting key levers B' are employed, when a lever is pressed downward at its outer end, the inner end of the lever will engage with the lower edge of the shifting cam C, and will turn the said cam the required distance to bring the type or character designated on the lever operated, in position to produce an impression. The lock described may not be sufficient; therefore, an auxiliary lock can be provided, which is found in the toothed ring 38, since when the inner end of the key lever is passed into the slot 17$^a$ of the shifting cam C, and before it reaches the upper end of the said slot 17$^a$, the inner end of the key lever B will engage with the lower ring 36, and will raise the tubes 35 and consequently raise the toothed ring 38, bringing the teeth of the said ring in engagement with the extension arm 41 from the spindle 14. When a key lever enters the slot 17$^a$, the pin 41 will have rotated to its proper position above the notch between two adjacent teeth 39, each of which notches corresponds to a character on the type wheel. The pin 41, however, may not be accurately centered, but the ends of the teeth 39 being beveled, will bring the pin 41 to a central position, and there hold it during the operation of printing. As soon as the key lever is released from pressure, the frame consisting of the tubes 35 and the connected rings 36 and 38 will drop; the spring 31 will then restore the spindle 14 to its normal position, should it have been carried away from such position when the impression was made. This form of the device is especially adapted to insure the type wheel remaining accurately in position to produce the desired impression. The particular slot 17$^a$ is used as the bent ends of the non-radial or tangential key levers B' do not move in a line parallel with the spindle 14, and therefore the bent ends of said levers, after entering the slot, do not accurately lock the cam C, but give it a slight rotary motion. This motion is very slight compared to the motion of the cam while the lever B' is moved along its under edges, but is sufficient to prevent accurate printing unless means are taken to counteract it. There must be some play or looseness somewhere between the type wheel and the lever in order that the type wheel may be held rigid by the toothed ring 38 engaging the pin 41, while the cam C continues to rotate. I have provided for this play in two ways, by the motion of the sleeve 28 around the spindle 14, and by the extra dimensions of the slot 17$^a$. They may both be used in conjunction, or each singly. If I depend entirely on the extra width of the slot 17$^a$ for this necessary play, I can dispense with the parts 28, 29, 30, 31, 32 and 32$^a$ and use the cam C and supports as shown in Fig. 3. In the actual construction of the machine I expect to depend on the extra width of the slot 17$^a$ alone for the required play, but I do not restrict myself to such construction.

Having thus described my invention, I claim as new, and desire to secure by Letters Patent,—

1. In a typewriting or similar machine, a cylindrical type wheel, a spindle therefor, a skeleton spiral cam connected with the spindle, and a key lever tangential in relation to the cam and having its inner end bent to engage and turn the cam, the said cam being provided with a recess at its upper end adapted to loosely receive the bent end of the key lever and thereby effect a locking engagement with the key lever, as specified.

2. In a typewriting or similar machine, a cylindrical type wheel, a spindle therefor, a skeleton spiral cam attached to the said spindle, the said spiral cam being circular in plan and elongated in face view, and a spring controlled key lever tangential in relation to the cam, the inner end of said lever being bent and adapted for engagement with an edge of said cam to turn the same, and through said cam to turn the spindle and the type wheel, the said cam being provided with a recess adapted to receive the end of the lever, as specified.

3. In a typewriting or similar machine, a type wheel, a spindle therefor, a skeleton spiral cam circular in plan and elongated in face view and having opposing points oppositely disposed, a recess at one side of the center of the upper point, and supporting arms connecting the inner face of the cam at its pointed ends with the said spindle, as set forth.

4. In a type writing machine, the combination with a type wheel, a spindle therefor, a sleeve having limited rotary movement on the said spindle, a spiral cam attached to the said sleeve, the said cam being circular in plan and elongated in face view and provided with a recess at its upper end extending from its under edge, and a spring attached to the upper end of the sleeve and to the said spindle, of standards at opposite sides of the spindle, a frame mounted to slide on the said standards, which frame includes an upper and a lower ring encircling the said spindle, the upper ring having teeth thereon, an extension arm for the spindle, projecting over the teeth of the said upper ring, and a series of key levers having their inner ends bent and arranged in a circular group under the cam, the inner end of each key lever being adapted to engage with an edge of the said spiral cam to rotate the said spindle, to enter the recess in the said cam and to engage with the frame at one point in its movement, carrying the toothed ring in engagement with the extension from the said spindle, whereby to effect an engagement between said extension and the teeth of the upper ring, for the purpose described.

5. In a typewriting machine, the combination with a type wheel, a spindle therefor, and a spiral cam connected with the spindle, the said cam being provided with a recess at its upper end extending from its under edge, of a frame mounted to slide vertically, and provided with a toothed ring, an arm on the spindle projecting over the teeth of said ring, and a series of key levers having their inner ends bent and arranged in a circular group under the cam, each key lever being adapted to engage the cam to rotate the spindle, the inner end of said lever being adapted to enter the recess in the cam and also to engage with the said frame to move the toothed ring in engagement with the arm on the spindle, as set forth.

6. In a typewriting machine, the combination with a type wheel, a spindle therefor, a spiral cam connected with the spindle and provided with a recess at its upper end, of standards at opposite sides of the spindle, a frame mounted to slide on said standards and including an upper and a lower ring encircling the said spindle, the upper ring having teeth thereon, an arm for the spindle projecting over the teeth of the said upper ring, and a series of key levers having their inner ends bent and arranged in a circular group under the cam, the inner end of each lever being adapted to engage with an edge of the spiral cam to rotate the spindle, the said inner end of the lever being adapted to enter the recess in the cam and to engage with the frame at one point in its movement to move the toothed ring of the frame in engagement with the arm of the spindle, as set forth.

7. In a typewriting or similar machine, a type wheel, a spindle therefor, a skeleton spiral cam connected with the spindle, the said cam being circular in plan and elongated in face view, and a series of key levers arranged tangentially to the cam and having their inner ends bent and arranged in circular form at the under edge of the cam, the said cam being provided with a slot or recess at its upper end adapted to loosely receive the bent end of either of said key levers, as set forth.

8. In a typewriting or similar machine, a cylindrical type wheel, a spindle therefor, a spiral cam connected with the spindle, the said cam being circular in plan view and oblong in face view, and having pointed terminal ends inclined in opposite directions, and a series of key levers arranged to form a straight line keyboard, the said levers having their inner ends bent and arranged in a circular group at the under side of the cam, each of said levers being adapted to move in engagement with an edge of the cam to turn the type wheel, the said cam being provided with a slot adjacent to its upper point adapted to loosely receive the bent end of either of said key levers.

9. In a type writing or similar machine, a type wheel, a spindle therefor, a spiral cam connected with the spindle, and a key lever mounted to move in a plane non-radial to the cam and having its end bent inward and arranged under the cam, the bent end of the lever being adapted to move in engagement with an edge of the cam to turn the same and the type wheel, the said cam being provided with a slot or recess adapted to be engaged by the bent end of the lever to lock the cam.

10. In a type writer or similar machine, a type wheel, a spindle therefor, a spiral cam connected with the spindle and having a recess at its upper end, and a series of key levers having their ends arranged under the cam and each adapted to engage and turn the cam and to enter the recess in the cam, the key levers at each side of the central lever having their inner ends bent inward, the levers on each side of the central lever having their bent ends gradually increasing in length, the extremities of the levers being arranged in a circular group under the cam.

In testimony whereof I have signed my name to this specification in the presence of two subscribing witnesses.

WILLIAM C. PAUL.

Witnesses:
J. FRED. ACKER,
JNO. M. RITTER.